(12) United States Patent
Hsiao et al.

(10) Patent No.: US 9,933,562 B2
(45) Date of Patent: Apr. 3, 2018

(54) DISPLAY DEVICE

(71) Applicant: Wuhan China Star Optoelectronics Technology Co., Ltd., Wuhan, Hubei (CN)

(72) Inventors: Yuchun Hsiao, Guangdong (CN); Shihhsiang Chen, Guangdong (CN); Chengwen Que, Guangdong (CN); Dehua Li, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days.

(21) Appl. No.: 14/770,085

(22) PCT Filed: May 6, 2015

(86) PCT No.: PCT/CN2015/078399
§ 371 (c)(1),
(2) Date: Aug. 24, 2015

(87) PCT Pub. No.: WO2016/172993
PCT Pub. Date: Nov. 3, 2016

(65) Prior Publication Data
US 2016/0349446 A1 Dec. 1, 2016

(30) Foreign Application Priority Data
Apr. 28, 2015 (CN) .......................... 2015 1 0210073

(51) Int. Cl.
*F21V 8/00* (2006.01)
*H04N 5/64* (2006.01)
*H04N 5/66* (2006.01)

(52) U.S. Cl.
CPC ........... *G02B 6/0085* (2013.01); *G02B 6/005* (2013.01); *G02B 6/0088* (2013.01); *H04N 5/64* (2013.01); *H04N 5/66* (2013.01)

(58) Field of Classification Search
CPC ..... G02B 6/0085; G02B 6/0088; G02B 6/005
See application file for complete search history.

(56) References Cited

U.S. PATENT DOCUMENTS

| 8,477,264 | B2 * | 7/2013 | Morito | G02F 1/133615 349/58 |
| 8,749,732 | B2 * | 6/2014 | Ji | G02B 6/0085 349/58 |
| 2009/0128732 | A1 * | 5/2009 | Hamada | G02B 6/0068 349/58 |

(Continued)

FOREIGN PATENT DOCUMENTS

| CN | 103439831 A | 12/2013 |
| TW | 201239472 A1 | 10/2012 |

*Primary Examiner* — Elmito Breval
(74) *Attorney, Agent, or Firm* — Andrew C. Cheng

(57) ABSTRACT

The display device contains a base and a display unit. The display unit contains a backlight source configured to an edge portion of the display unit. The edge portion of the display unit is plugged into the base. The present invention integrates a base with the display unit so that a thicker backlight source is concealed in the base whereas the portion of the display unit that is exposed outside the base can have an ultra-thin structure, thereby achieving the superior appearance and still conforming to the ultra-thin design trend.

5 Claims, 3 Drawing Sheets

(56) References Cited

U.S. PATENT DOCUMENTS

| | | | |
|---|---|---|---|
| 2010/0085502 A1* | 4/2010 | Yen | G02F 1/133615 349/58 |
| 2010/0118514 A1* | 5/2010 | Cho | G02B 6/0068 362/97.1 |
| 2010/0165244 A1* | 7/2010 | Shin | G02F 1/133308 349/62 |
| 2011/0043721 A1* | 2/2011 | Hwang | G02B 6/0085 349/58 |
| 2012/0281165 A1* | 11/2012 | Choi | G02B 6/009 349/62 |
| 2012/0320623 A1* | 12/2012 | Wada | G02B 6/0088 362/602 |
| 2013/0107168 A1* | 5/2013 | Tang | G02B 6/0088 349/62 |
| 2013/0128613 A1* | 5/2013 | Tang | G02F 1/133308 362/609 |
| 2013/0258240 A1* | 10/2013 | Yu | G02F 1/133608 349/61 |
| 2013/0258708 A1* | 10/2013 | Huang | G02B 6/0023 362/608 |
| 2013/0271691 A1* | 10/2013 | Yu | G09F 13/04 349/58 |

* cited by examiner

DISPLAY DEVICE

BACKGROUND OF THE INVENTION

1. Field of the Invention

The present invention relates to the field of display techniques, and in particular to a display device.

2. The Related Arts

Currently TVs are geared towards an ultra-thin and curved screen design as both provide TVs with a fashionable and visually appealing appearance. However, additional requirements are as such imposed on the internal structural design of the TVs.

For example, lamp strips (as light source) and related heat dissipation mechanism are configured along some edges of the TVs. These elements are usually structurally complex and take up specific space, therefore conflicting with the ultra-thin design trend.

SUMMARY OF THE INVENTION

To obviate the shortcoming of the prior art, the present invention provides a novel and ultra-thin display device.

To achieve the objective, the present invention adopts the following technical means.

The display device contains a base and a display unit. The display unit contains a backlight source configured to an edge portion of the display unit. The edge portion of the display unit is plugged into the base.

The base has a slot for receiving the edge portion of the display unit.

The display unit further contains sequentially attached, from a front side to a back side of the display unit, a panel, an optical film set, a light guide plate, a back plate, a front frame, and a heat dissipation element. The heat dissipation element contains a first parallel section and a first vertical section connected together. The backlight source is configured on the first vertical section. The front frame is configured in front of the panel. The front frame and the first parallel section are attached to two opposite inner walls of the slot, respectively.

The display unit further contains a plastic frame housed in the slot. The plastic frame contains a second parallel section and a second vertical section connected together. The second parallel section is attached to a portion of a front side of the light guide plate, and the second vertical section is configured between the first vertical section and the front frame.

The base contains a front case and a back case oppositely joined together to provide the slot.

The front and back cases are held together by a plurality of fastening elements.

A first bulging piece is extended from an inner wall of the back case into the slot and above the first parallel section, therefore preventing the heat dissipation element from escaping the slot.

A second bulging piece is extended from an inner wall of the back case into the slot and, correspondingly, the first parallel section has a notch for receiving the second bulging piece, therefore preventing the heat dissipation element from escaping the slot.

An inner wall of the back case has a slope so that the slot is divided into a wider bottom section and a narrower upper section. Correspondingly, the heat dissipation element further contains a slant section between the first parallel section and the first vertical section tightly attaching to the slope.

The base contains a front case and a back case oppositely joined together to provide the slot.

The front and back cases are held together by a number of fastening elements.

A first bulging piece is extended from an inner wall of the back case into the slot and above the first parallel section, therefore preventing the heat dissipation element from escaping the slot.

A second bulging piece is extended from an inner wall of the back case into the slot and, correspondingly, the first parallel section has a notch for receiving the second bulging piece, therefore preventing the heat dissipation element from escaping the slot.

An inner wall of the back case has a slope so that the slot is divided into a wider bottom section and a narrower upper section. Correspondingly, the heat dissipation element further contains a slant section between the first parallel section and the first vertical section tightly attaching to the slope.

The present invention integrates a base with the display unit so that the thicker backlight source is concealed in the base whereas the portion of the display unit that is exposed outside the base can have an ultra-thin structure, thereby achieving the superior appearance and still conforming to the ultra-thin design trend.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

First Embodiment

Figure 1:
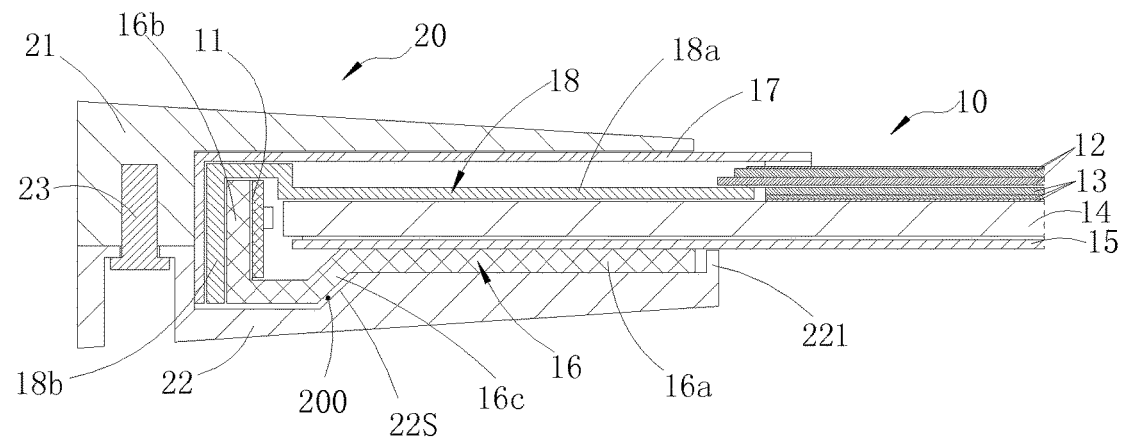
FIG. 1 is a sectional diagram showing a display device according to a first embodiment of the present invention.

As shown in FIG. 1, a display device according a first embodiment of the present invention contains a display unit 10 and a base 20.

Figure 2:
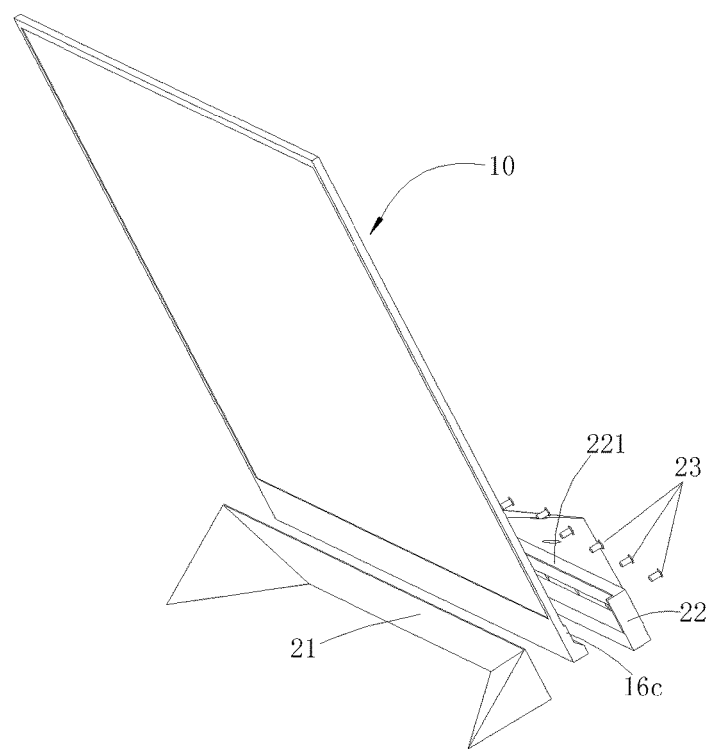
FIG. 2 is a perspective break-down diagram showing the display device of FIG. 1.
Figure 3:
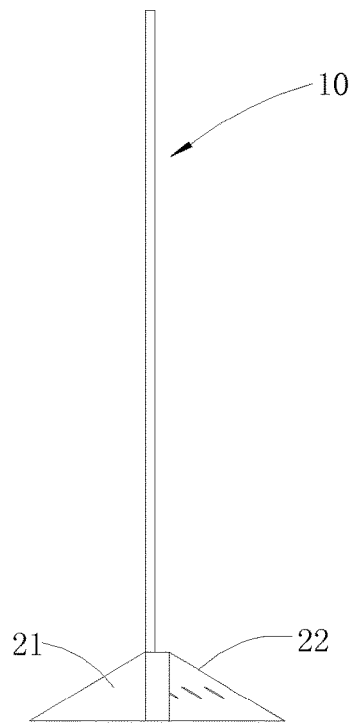
FIG. 3 is a profile diagram showing the display device of FIG. 1 after its assembly.
Figure 4:
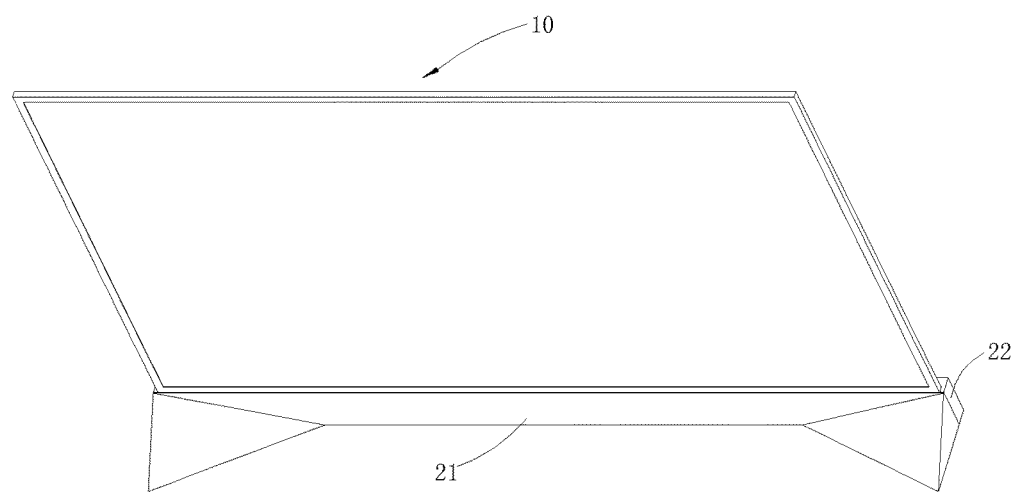
FIG. 4 is a perspective diagram showing the display device of FIG. 1 after its assembly.

More specifically, as shown in FIGS. 2 to 4, the base 20 contains a front case 22 and a back case 21 joined oppositely together to form a slot 200 therebetween. An edge portion of the display unit 10 where a backlight source 11 is configured is plugged into the slot 200 and as such sandwiched by the front and back cases 21 and 22. In the present embodiment, the front and back cases 21 and 22 are held together by a number of fastening elements 23. In the present embodiment, the fastening elements 23 are bolts with threads. In alternative embodiments, the front and back cases 21 and 22 can be held together by locking or similar means.

The display unit 10 contains sequentially attached (from a front side to a back side of the display unit 10) a panel 12, an optical film set 13, a light guide plate 14, a back plate 15, and a heat dissipation element 16. The heat dissipation element 16 contains a first parallel section 16a and a first vertical section 16b connected together. The backlight source 11 is configured on the first vertical section 16b. A front frame 17 is configured in front of the panel 12. The front frame 17 and the first parallel section 16a are attached to two opposite inner walls of the slot 200, respectively.

A plastic frame 18 is also housed in the slot 200. The plastic frame 18 contains a second parallel section 18a and a second vertical section 18b connected together. The second parallel section 18a is attached to a portion of a front side of the light guide plate 14. The panel 12 is configured both in front of the second parallel section 18a and the optical film set 13. The second vertical section 18b is configured between the first vertical section 16b and the front frame 17.

A first bulging piece 221 is extended from an inner wall of the back case 22 into the slot 200 and above the first parallel section 16a, therefore preventing the heat dissipation element 16 from escaping the slot 200 and providing additional protection to the display unit 10.

In the present embodiment, the first bulging piece 221 is at an opening of the slot 200 an can be achieved by bending a top edge of the back case 22.

Preferably, the inner wall of the back case 22 has a slope 22S so that the slot 200 is divided into a wider bottom section and a narrower upper section (both not numbered). Correspondingly, the heat dissipation element 16 further contains a slant section 16c between the first parallel section 16a and the first vertical section 16b tightly attaching to the slope 22S. The slot 200 therefore has the bottom section housing the thicker backlight source 11 and the upper section for the thinner display unit 10. The display unit 10 is therefore securely clamped in the slot 200, effectively preventing the display unit 10 from escaping the slot 200.

As the thicker portion of the display unit 10 having the backlight source 11 is housed in the slot 200 of the base 20, the other portion of the display unit 10 that is exposed outside the base 20 can still be made very thin, thereby achieving a superior appearance and conforming to the ultra-thin design trend.

Second Embodiment

Figure 5:
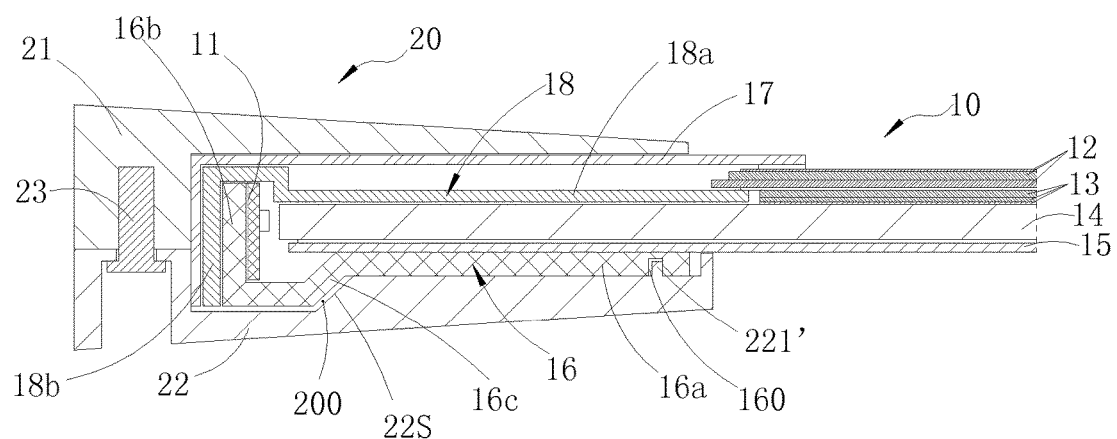
FIG. 5 is a sectional diagram showing a display device according to a second embodiment of the present invention.

As shown in FIG. 5, a major difference between the present embodiment and the previous embodiment is that a second bulging piece 221' below the first bulging piece 221 is extended from an inner wall of the back case 22 into the slot 200. Correspondingly, the first parallel section 16a has a notch 160 for receiving the second bulging piece 221'. The purpose of the second bulging piece 221' is also for preventing the heat dissipation element 16 from escaping the slot 200 and providing additional protection to the display unit 10.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A display device, comprising:
    a base comprising a front case and a back case oppositely joined together to provide a slot in between;
    a heat dissipation element housed in the slot;
    a backlight source housed in the slot; and
    a display unit having a bottom portion plugged into the slot;
    wherein
    top ends of the front and back cases at the slot's opening are basically at a same height;
    the heat dissipation element comprises a first vertical section, a first parallel section, and a slant section between the first parallel and vertical sections slanting towards inside of the slot;
    the first vertical section is parallel to a bottom side of the slot;
    the backlight source is configured on the first vertical section below the bottom portion of the display unit;
    the first parallel section is attached to a back side of the display unit;
    an inner wall of the back case has a first bulging piece extended from the top end of the back case into the slot and immediately above the first parallel section's top end of the heat dissipation element, and a slope in a middle section slanting towards inside of the slot;
    the slant section of the heat dissipation element tightly attaches to the slope of the back case.

2. The display device as claimed in claim 1, wherein the display unit comprises sequentially attached, from a front side to a back side of the display unit, a panel, an optical film set, a light guide plate, and a back plate.

3. The display device as claimed in claim 2, further comprising a plastic frame housed in the slot; wherein the plastic frame comprises a second parallel section and a second vertical section connected together; the second parallel section is attached to a portion of a front side of the light guide plate; and the second vertical section is configured between the first vertical section and the front frame.

4. The display device as claimed in claim 1, wherein the front and back cases are held together by a plurality of fastening elements.

5. The display device as claimed in claim 1, wherein a second bulging piece is extended from an inner wall of the back case into the slot; and, correspondingly, the first parallel section has a notch for receiving the second bulging piece, therefore preventing the heat dissipation element from escaping the slot.

* * * * *